(12) United States Patent
Murray

(10) Patent No.: US 10,470,111 B1
(45) Date of Patent: Nov. 5, 2019

(54) PROTOCOL TO DETECT IF UPLINK IS CONNECTED TO 802.1D NONCOMPLIANT DEVICE

(71) Applicant: HEWLETT PACKARD ENTERPRISE DEVELOPMENT LP, Palo Alto, CA (US)

(72) Inventor: Christopher Murray, Boynton Beach, FL (US)

(73) Assignee: Hewlett Packard Enterprise Development LP, Houston, TX (US)

(*) Notice: Subject to any disclaimer, the term of this patent is extended or adjusted under 35 U.S.C. 154(b) by 0 days.

(21) Appl. No.: 15/961,950

(22) Filed: Apr. 25, 2018

(51) Int. Cl.
| H04W 4/00 | (2018.01) |
| H04W 48/16 | (2009.01) |
| H04W 48/14 | (2009.01) |
| H04L 12/24 | (2006.01) |
| H04W 8/00 | (2009.01) |

(52) U.S. Cl.
CPC ............ *H04W 48/16* (2013.01); *H04L 41/12* (2013.01); *H04W 8/005* (2013.01); *H04W 48/14* (2013.01)

(58) Field of Classification Search
None
See application file for complete search history.

(56) References Cited

U.S. PATENT DOCUMENTS

| 8,553,565 | B2 | 10/2013 | Kamachi et al. |
| 8,873,433 | B2 | 10/2014 | Kahkoska |
| 9,191,278 | B2 | 11/2015 | Schlichter et al. |
| 2011/0022693 | A1* | 1/2011 | Cheethirala ........... H04L 49/357 709/222 |
| 2012/0317567 | A1* | 12/2012 | Bailey ..................... H04L 41/04 718/1 |
| 2014/0211793 | A1* | 7/2014 | Mital ...................... H04L 45/22 370/389 |
| 2014/0359620 | A1* | 12/2014 | Van Kerkwyk ....... H04L 41/042 718/1 |
| 2017/0048128 | A1 | 2/2017 | Perkinson et al. |
| 2017/0310548 | A1* | 10/2017 | Jailani ................. H04L 41/0886 |

(Continued)

OTHER PUBLICATIONS

"Fluke Networks: One-Click Switched Network Vision," Feb. 2, 2018, 19 pages, https://msdn.microsoft.com/en-us/library/cc722544.aspx.

*Primary Examiner* — Farah Faroul
(74) *Attorney, Agent, or Firm* — Nolte Intellectual Property Law Group

(57) ABSTRACT

The IEEE 802.1D specification has reserved a group of MAC addresses that should not be forwarded by a switch. Protocols like LLDP use the reserved MAC address to communicate directly with a switch to share configure information. There are non-compliant 802.1D switches and hubs that incorrectly broadcast the packets using the reserved MAC addresses out all ports except the ingress port. When multiple uplinks are connected to an unmanaged switch it may cause confusion because each uplink may receive LLDP packets from every other uplink. Frame Link Modules (FLMs) that receive an LLDP packet from another management port may determine if the management uplinks are connected together or if the packets are being received from an unmanaged switch. Disclosed is a method to determine if an uplink from a network uplink is connected to a noncompliant 802.1D switch or connected directly to another FLM uplink.

15 Claims, 9 Drawing Sheets

(56) References Cited

U.S. PATENT DOCUMENTS

| | | |
|---|---|---|
| 2018/0115501 A1* | 4/2018 | Reynolds ................ H04L 47/25 |
| 2018/0205671 A1* | 7/2018 | Hung .................. H04L 49/3009 |
| 2018/0254985 A1* | 9/2018 | Ballard ................... H04L 45/48 |
| 2018/0288126 A1* | 10/2018 | Smart .................... H04L 69/22 |
| 2019/0104127 A1* | 4/2019 | Da Silva Peixoto ........................ H04L 63/101 |

* cited by examiner

LLDP PACKET DEFINITION

LLDP PACKETS WITH A NEW TLV DEFINED WILL BE USED TO DETERMINE IF AN UPLINK IS CONNECTED TO ANOTHER UPLINK OR CONNECTED TO AN UNMANAGED SWITCH

| TLV TYPE (7 BITS) | TLV INFO STRING LENGTH (9 BITS) | OUI (24 BITS) | ORG SUBTYPE (1 OCTET) | FLM UPLINK STATE (1 OCTET) | TYPE (1 OCTET) | COMMAND (1 OCTET) | STATUS (1 OCTET) |
|---|---|---|---|---|---|---|---|
| 127 | 4 | 08:00:09 | 0xF0 | 8 BITS | 8 BITS | 8 BITS | 8 BITS |

FLM — 405

THE FRAME LINK MODULE (FLM) UPLINK STATE DESCRIBES THE STATE OR FUNCTION OF THE UPLINK.

410

| FLM UPLINK FUNCTION | DESCRIPTION |
|---|---|
| 1 | ACTIVE UPLINK |
| 2 | STANDBY UPLINK |

THE TYPE FUNCTION DEFINES WHICH OF THE FOLLOWING TWO FIELDS WILL BE USED EITHER COMMAND OR STATUS.

415

| TYPE | DESCRIPTION |
|---|---|
| 1 | COMMAND |
| 2 | STATUS |

THE COMMAND FIELD IS THE COMMAND SENT FROM EACH OF THE FLMS.

420

| COMMAND | DESCRIPTION |
|---|---|
| 1 | DROP LINK |

THE STATUS FIELD IS THE RESULT OF IMPLEMENTING THE COMMAND. BOTH FLMS WILL SEND A STATUS.

425

| STATUS | DESCRIPTION |
|---|---|
| 1 | LINK DROP DETECTED |
| 2 | NO LINK DROP DETECTED |

FIG. 4

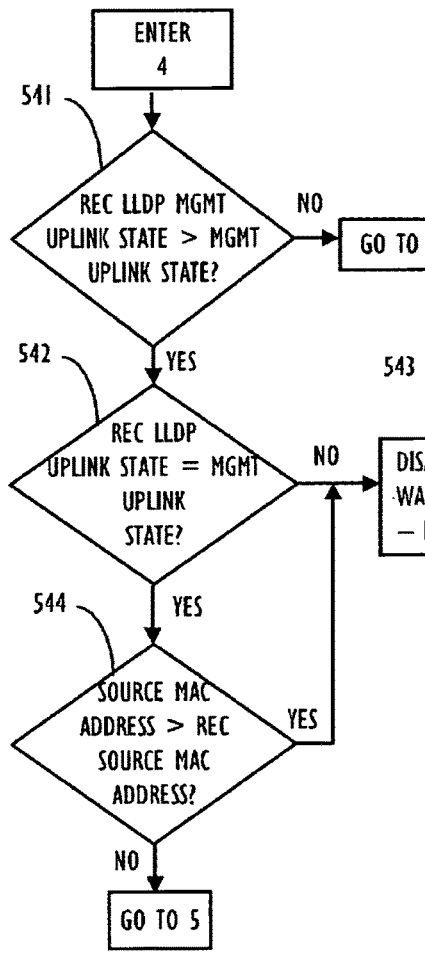
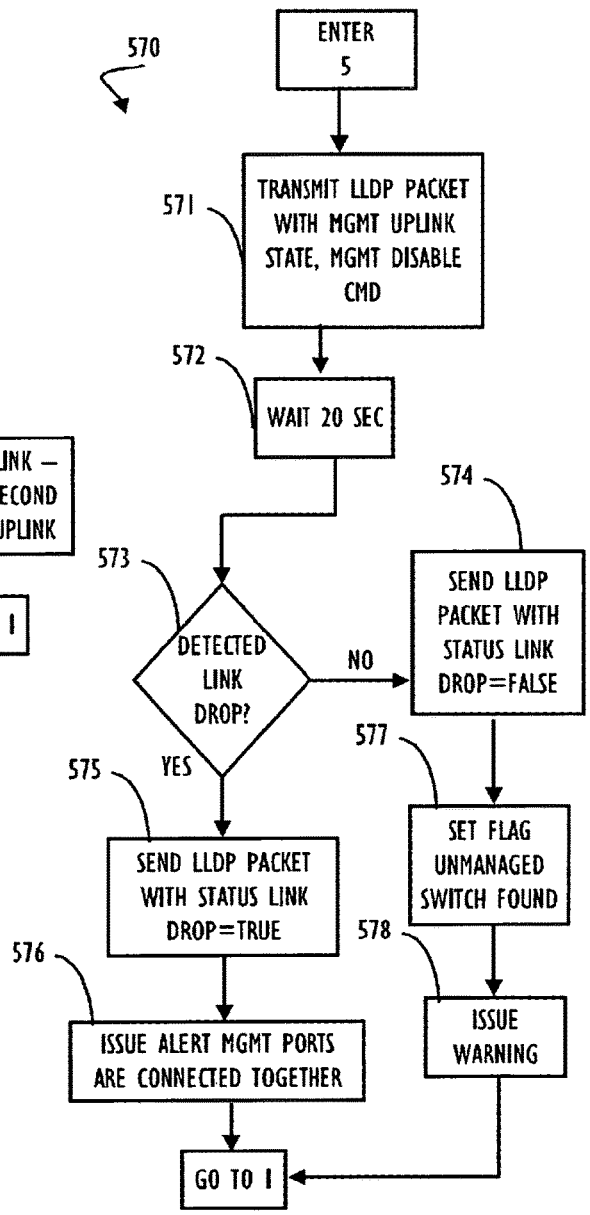
FIG. 5B
FIG. 5C

US 10,470,111 B1

PROTOCOL TO DETECT IF UPLINK IS CONNECTED TO 802.1D NONCOMPLIANT DEVICE

BACKGROUND

In the field of scalable compute resources, network connectivity between nodes, blades, or frames, of network modules may represent a primary communication path for sharing data between those nodes. The data may represent inputs to compute process (e.g., data or applications), outputs of compute resources (e.g., compute results), communications to coordinate distributed processes, and other types of data. In some architectures, nodes of network modules within a blade server, cluster, or frame may be connected to each other using an intervening network resource (e.g., a bridge).

An intervening network resource may represent a non-compliant device (e.g., a legacy device or other functioning device), a potential additional point of failure, or even a security risk (e.g., an intrusion system attempting to steal data from the network). In any case, it may be desirable to actively detect a non-compliant device active on the network. Once detected a system administrator may be made aware of the non-compliant device and take appropriate action (e.g., remove the device or determine that a functioning non-compliant device is acceptable). Note, that in some cases the non-compliant device will not be readily apparent in the network because it may not present any serious adverse conditions to other devices. Further, in the case of a security intrusion, the non-compliant device may actively try to conceal its existence. Typically, the non-compliant device will simply forward every packet it receives immediately along the network path and that may result in error conditions elsewhere on the network. Of course, there are situations where this additional forwarding may not cause any noticeable errors, but sometimes improper configurations and network failures may also result. Accordingly, it may desirable for the owner of the network (e.g., corporation, research division, etc.) to be advised of the existence of a non-compliant device or a connection anomaly.

BRIEF DESCRIPTION OF THE DRAWINGS

The present disclosure may be better understood from the following detailed description when read with the accompanying Figures. It is emphasized that, in accordance with standard practice in the industry, various features are not drawn to scale. In fact, the dimensions or locations of functional attributes may be relocated or combined based on design, security, performance, or other factors known in the art of computer systems. Further, order of processing may be altered for some functions, both internally and with respect to each other. That is, some functions may not require serial processing and therefore may be performed in an order different than shown or possibly in parallel with each other. For a detailed description of various examples, reference will now be made to the accompanying drawings, in which:

FIG. 4 is a block diagram of a possible set of messages that may be used to implement the techniques of this disclosure, according to one or more disclosed embodiments;

FIGS. 5A-C illustrate a single flow chart representing a possible method to perform non-compliant device detection, according to one or more disclosed implementations;

DETAILED DESCRIPTION

Figure 1:
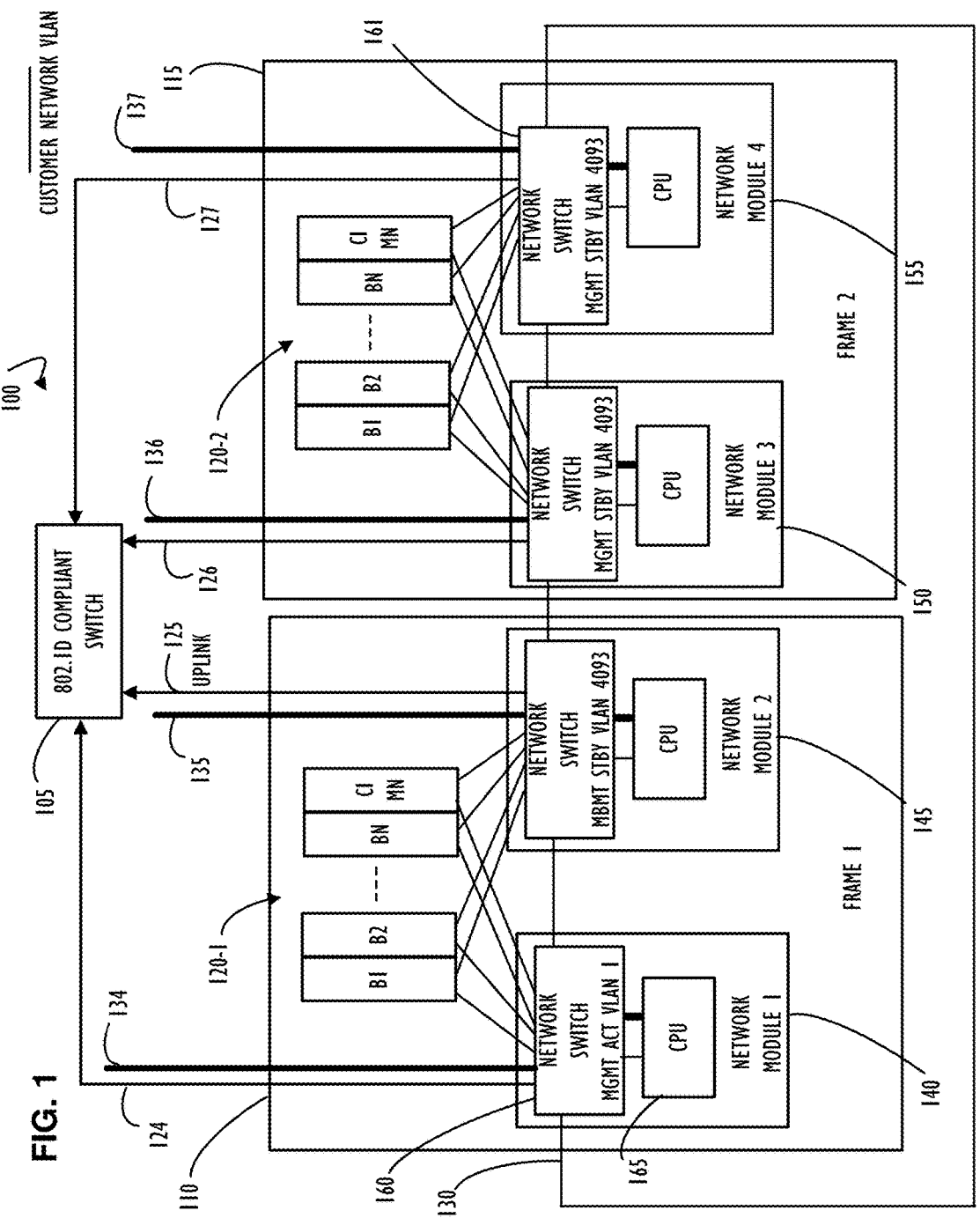
FIG. 1 is a functional block diagram of a computer infrastructure including multiple frame scalable compute resources, a customer VLAN, and a management VLAN, and a compliant bridge device on the network, according to one or more disclosed implementations.

Network security, fault tolerance, and performance represent important considerations for computer networks. One security aspect includes ensuring that connected network devices are configured properly. Sometimes this configuration relies on corporate standards or industry standards (e.g., IEEE standards). In order to be completely configured properly a network device should adhere to all applicable communication standards. Further, in some scalable compute resource implementations, network modules provide access to compute modules in each frame and therefore network efficiency may have an increased importance. That is, a scalable compute resource may rely more heavily on efficient network communication between nodes than a traditional distributed system.

The IEEE 802.1D specification has reserved a group of media access control (MAC) addresses that should not be forwarded by a switch. Protocols like link layer discovery protocol (LLDP) use the reserved MAC address to communicate directly with a switch to share configure information. However, there exist non-compliant 802.1D switches and hubs that incorrectly broadcast the packets using the reserved MAC addresses out all ports except the ingress port. When multiple uplinks are connected to an unmanaged switch it may cause confusion because each uplink may receive LLDP packets from every other uplink. Frame Link Modules (FLMs) that receive an LLDP packet from another management port may determine if the management uplinks are connected together or if the packets are being received from an unmanaged switch. Disclosed is a method to determine if an uplink from a network uplink is connected to a noncompliant 802.1D switch or connected directly to another FLM uplink. The above referenced IEEE 802.1D standard is incorporated by reference herein, for all applicable purposes.

Specifically, the IEEE MAC group address block has been divided into two categories. The first category are reserved MAC addresses that cannot be forwarded by a switch, for example, IEEE 802.1D MAC Bridge Filtered MAC Group Addresses: 01-80-C2-00-00-00 to 01-80-C2-00-00-0F; MAC frames that have a destination MAC address within this range are not relayed by MAC bridges conforming to IEEE 802.1D. LLDP and G8032 CCP Messages use the reserved MAC addresses, for example, Standard MAC Group Addresses: 01-80-C2-00-00-10 to 01-80-C2-FF-FF-FF; MAC frames that have a destination MAC address within this range may be relayed by MAC bridges conforming to IEEE 802.1D.

In one example scenario of this disclosure, it is understood that a managed switch will not forward a packet via the network that has been received with a destination MAC address that is in the MAC Bridge Filtered MAC Group Address range. When the packet is received it will be forwarded only internally to the switch CPU. The same behavior applies to the FLM. A packet with a reserved MAC address received on any switch port will be forwarded to the FLM CPU PCI interface and not forwarded on the network. Each FLM may transmit LLDP packets out its management port at periodic intervals. Every FLM in a ring may have a management port connected to a TOR switch. Only one FLM may have the active management port. All other FLMs may have a standby management port. The active management port is typically a member of VLAN 1 (e.g., network module 1, 140 of FIG. 1). All standby management ports are typically members of VLAN 4093 and they will not accept untagged traffic (e.g., network module 2, 145, network module 3, 150, and network module 4, 155 of FIG. 1) but may continue to accept packets with a reserved destination MAC address and forward those packets to the host switch CPU (e.g., 165). In this example, the standby management ports are members of 4093 while no other switch port in each FLM is a member of this VLAN so all traffic tagged or untagged will be dropped. Each standby port is a member of VLAN 4093 so that they may remain enabled allowing any switchover between the active and standby to occur faster. The G.8032 owner monitors which uplinks are available for a switchover.

In some implementations, the method disclosed addresses a problem of determining an uplink from an FLM, in a Synergy network for example, is connected into another FLM uplink or it is connected to an unmanaged switch. Two uplinks connected together represents an error while uplinks connected into an unmanaged switch is not necessarily a fatal error because connectivity still exists. Uplinks connected into an unmanaged switch may exhibit the same behavior as uplinks connected together by the reception of LLDP packets. Accordingly, this disclosure describes a method and system where implementations may be used to detect each of these conditions.

Previously, one way to address the issue of a non-compliant switch was to disable the uplink on the first LLDP packet received from another FLM and assuming the uplinks are connected together. If the uplinks that are assumed to be connected together are disabled, this may allow uplink monitor software to search for another uplink for the group of frames they may be connected to switch correctly. However, this approach has had some issues. Specifically, there have been instances where customers had the uplinks connected into an unmanaged TOR network, and the uplink monitor software assumed that the uplinks were connected together. Of course, disabling the uplinks merely because they are connected to an unexpected type of network may not be desirable.

Referring to FIG. 1, an example computer infrastructure 100 is illustrated. In this example, a customer network is connected, via a compliant bridge device 105, to a set of frames (represented by frame 1 110, and frame 2 115). Of course, more than two frames may be present but for simplicity of this disclosure only two are shown in this example. As indicated by arrow 120-1, frame 1 may be configured with a set of blades (B1, B2, . . . BN) and a Composable Infrastructure (CI) module. Similarly, arrow 120-2 indicates that frame 2 may be configured in a like manner. Frame 1 further includes two network modules 140 and 145 (sometimes referred to as a Frame Link Module (FLM)). Frame 2 also include two network modules 150 and 155. These network modules provide connectivity for the compute resources represented by the blades. Each of the blades is shown with a network connection to a network switch 160 disposed within each individual network module (e.g., network module 1, 140). Each network module further includes a CPU 165 to facilitate configuration, monitoring, and maintenance of a corresponding network switch 160.

Connectivity from a set of frames to a customer network is typically provided by a single uplink 125 from exactly one of the plurality of network switches that exist across the multiple FLMs of a group of connected frames. That is, all communications external to the group of connected frames passes through uplink 125. As further illustrated in computer infrastructure 100, customer VLAN 130 connects each of the network switches 160 in an ethernet ring network. A second standby management VLAN 4093 may be implemented on network module 2 145, network module 3 150, and network module 4 155 as shown by network switch 161. Management standby VLAN 4093 is not actually connected to other devices but instead is in standby mode with corresponding links enabled. Note, in a proper configuration of a group of frames, each network switch will be directly connected to each neighboring switch on a customer network VLAN (either in the same frame or an adjacent frame) and no intervening network devices are present.

A virtual LAN (VLAN) refers to a broadcast domain that is partitioned and isolated in a computer network at the data link layer (OSI layer 2). LAN is the abbreviation for local area network and in this context virtual refers to a physical object recreated and altered by additional logic. A VLAN is a custom network created from one or more existing LANs. It enables groups of devices from multiple networks (both wired and wireless) to be combined into a single logical network. The result is a virtual LAN that can be administered like a physical local area network, for example 4093 management VLAN 135 in FIG. 1.

In this disclosure, a ring topology of network modules will be discussed. However, the proposed techniques are expected to work for any network topology and should not be limited to a ring topology. In one implementation, the disclosed technique addresses the network uplinks connected to the external switch. As shown in FIG. 1., a single network may have at least four uplinks (124, 125, 126, and 127) connected to an external switch 105. The first enclosure (e.g., frame 1, 110) has the active uplink 124 to external switch 105. The other three uplinks 125, 126, and 127, in this example, may be considered to be configured in an unused and reserved VLAN and they may send and receive LLDP packets, but all other received traffic is dropped. The LLDP packets may not be sent of received in the reserved VLAN and may be transmitted/received without a tag with the switch forwarding them to the CPU based on the MAC address. Accordingly, three standby links 125, 126, and 127 may be enabled but isolated to have fast link switchover if the active uplink (e.g., 124 in this example) becomes disconnected or has a problem. The managing software may track which of the standby links have a link that may take over for a failed active uplink. When each of the four network modules 140, 145, 150, and 155 transmits an LLDP packet, each LLDP packet is received by the external switch and not forwarded (because, in this example the external switch 105 is compliant with the 802.1D protocol).

Figure 2:
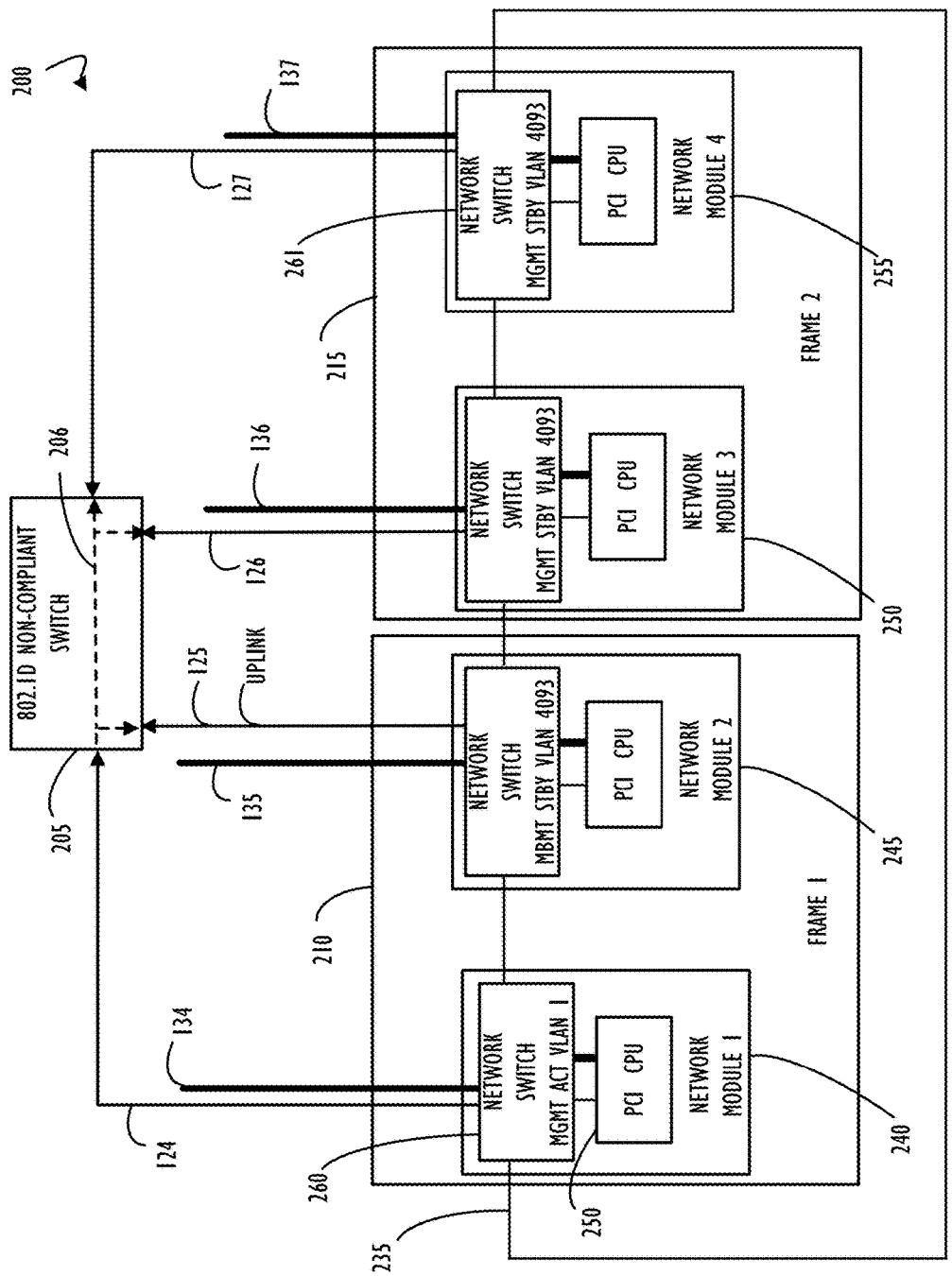
FIG. 2 is a functional block diagram representing a first example of a non-compliant bridge device on the network, according to one or more disclosed implementations.

Referring now to FIG. 2, a non-compliant, sometimes referred to as "unmanaged," switch 205 is illustrated as part of example computer infrastructure 200. FIG. 2. illustrates a similar configuration to that shown in FIG. 1 with PCI CPU processors 250; frames 1-4 represented by elements 24, 245, 250, and 255; and network switches on an active management VLAN 1 (260) and a management standby VLAN 4093 (261). As mentioned above, in an unmanaged switch or hub (i.e., a device non-compliant with 802.1D), the LLDP packets with the reserved MAC address are incorrectly forwarded out all the ports accept the ingress port as shown by the dashed arrows 206. This condition may cause confusion between each of the other network modules and their respective frames. These other network modules do not know if they are connected to an unmanaged switch 205 or directly connected to each other. If the uplinks are connected to each other an error condition exists but if they are merely connected to a non-compliant switch it is only a warning condition as the network may continue to function.

Figure 3:
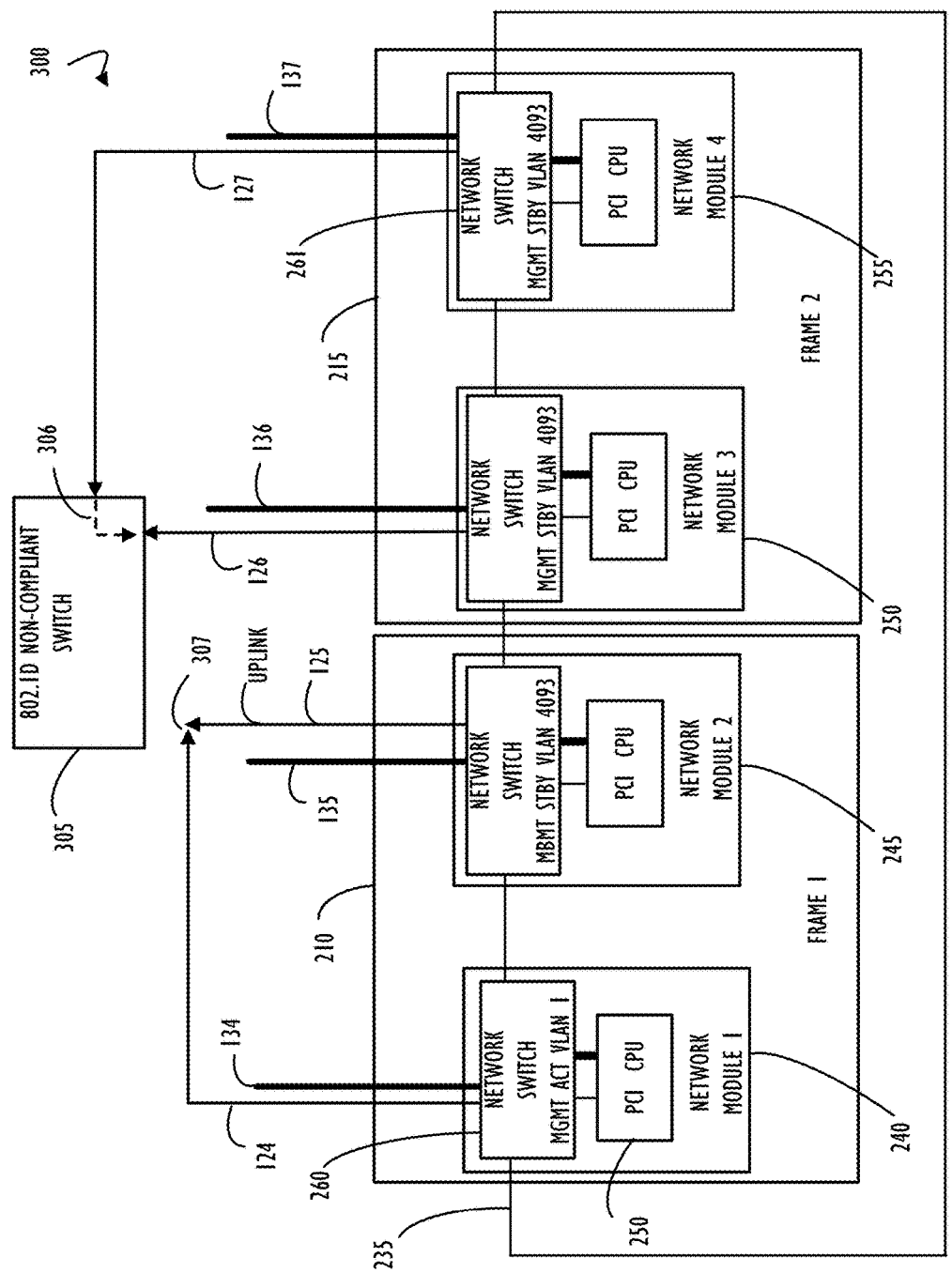
FIG. 3 is a functional block diagram representing a second example of a non-compliant bridge device and a network physical connection (e.g., cable connection) error example, according to one or more disclosed implementations.

Referring now to FIG. 3, example computer infrastructure 300 represents a variation of that shown in FIG. 2. Specifically, in FIG. 3, element 307 indicates that two uplinks 124 and 125 have been incorrectly connected together. This may be a result of a wiring error by a system administrator for example. Also, as in FIG. 2, both uplinks 126 and 127 are connected to a non-compliant device 305 that incorrectly forwards LLDP packets as illustrated by dashed arrow 306. To address this scenario, disclosed implementations may use a new LLDP TLV 400, shown in FIG. 4, that has been defined for the uplinks to communicate in the discovery of an unmanaged switch or connected directly together. The format of the LLDP TLV 400 as shown in FIG. 4, includes both command and status fields.

To identify if an uplink is connected to an unmanaged switch or uplinks are connected together a two step approach may be used. In general, if an uplink is connected to an unmanaged switch there will be other uplinks or downlinks connected to the same switch sending LLDP packets. LLDP packets are usually sent at periodic intervals so an FLM connected to an unmanaged switch will receive LLDP packets from different sources at different intervals. Each FLM may store the latest LLDP packet it has received. The LLDP data stored may then be used as part of the disclosed detection process.

In step 1, the LLDP daemon on a first FLM may check if it has received an LLDP packet from another FLM. If the LLDP daemon on the first FLM has received an LLDP packet from another FLM uplink, the LLDP daemon on the first FLM will then begin to check if it receives any other LLDP packet that is different from the first packet received. If the LLDP daemon on the first FLM receives LLDP packets from two different sources without the uplink being disconnected, then it is connected to an unmanaged switch. A flag will be set in the LLDP daemon to denote this. If the LLDP daemon receives LLDP packets from only one uplink consecutively an unmanaged switch cannot be ruled out because the uplinks may also be incorrectly connected together. In most cases, however, if an uplink is connected to an unmanaged switch step one should be able to verify that condition a majority of the time.

In step 2 of the disclosed technique, when the FLM with an active uplink continues to receive LLDP packets from the same source then a second technique may be used to determine if only two ports are connected to the same unmanaged switch (or the two uplinks are connected together). In general, step 2 may start after the reception of two or more identical LLDP packets received from another FLM uplink. Several different scenarios that may occur, include: 1. LM Active uplink and FLM standby uplink are receiving each other's LLDP packets; 2. FLM standby uplink and a second FLM standby uplink are receiving each other's LLDP packets; 3. FLM active uplink and FLM active uplink are receiving each other's LLDP packets. This can only occur when two distinct G.8032 rings are connected to the same unmanaged switch. If an FLM receives a LLDP packet from a second source while in step 2, it may terminate step 2 processing. Two LLDP packets from different sources signifies the uplink is connected to an unmanaged switch.

In some implementations of this disclosure, an FLM with the active uplink may start a 20 second timer (the amount of time is configurable) on the transmission of its LLDP packet stating the state of the FLM and command when it receives a LLDP message from another FLM uplink. If an FLM with a standby uplink receives an LLDP packet from the active uplink, that FLM may drop its uplink for a period of time (e.g., one second) and then re-enable it. The active uplink may not be toggled because the active uplink is likely providing connectivity to the external network. If the FLM with the active uplink detects a disable and then an enable of the uplink, the FLM with the active uplink will send a new LLDP packet stating that it has detected the link had dropped. If the active FLM detects the link drop the ports are directly connected together (with no intervening device), and if no link drop is detected it is a connection to an unmanaged switch. It is further expected that the active uplink also received an LLDP packet from the standby stating its uplink state. Also, if the active uplink did not detect a link drop in the 20 seconds then the active uplink will send an LLDP packet stating that the link did not drop. If a link drop was detected, the other non-active FLMs will block their uplink ports and generate a fault.

Using the new LLDP TLV discussed above (FIG. 4), in step 2 part 1 an FLM may transmit an LLDP packet as defined in this specification depending on the uplink state. In this example the FLM with the active uplink will send a packet stating its uplink state and a command for the receiver to drop its link for a second. The standby will transmit an LLDP packet with the uplink state as standby. Next, the FLM with the active uplink will start a 20 second timer to monitor if its uplink toggles. The standby will toggle the uplink on reception of the LLDP command packet from the FLM with the active uplink. The FLM with the active uplink will send an LLDP status packet stating whether it saw its uplink toggle. The active directly connected to the standby will have seen a link toggle. The FLM with the active uplink connected to the unmanaged switch will not have had an uplink toggle Advantages of the disclosed techniques include an ability to detect whether the uplinks are connected together or to an unmanaged switch. This may eliminate the previous method of addressing this sort of issue, where the uplink was disabled when it could not be determined what it is connected to. The disclosed technique may be performed automatically and if the software finds that two uplinks are connected together incorrectly the system may continue and look for an uplink in the ring or network that is connected correctly. Additionally, in some disclosed implementations, the active uplink does not stop receiving/transmitting data during the test to see if the ports are connected to an unmanaged switch, and if the ports are directly connected to each other it does not matter if the active uplink drops.

FIG. 4 is a block diagram 400 of a possible set of messages that may be used to implement the techniques of this disclosure, according to one or more disclosed embodiments. As explained throughout this disclosure, LLDP packets may be used that include to a new TLV defined to support the techniques explained. An example structure is identified at row 405 to explain the contents of the TLV. Entry 410 illustrates that the FLM update date describes the state or function of the uplink. Entry 415 illustrates that the type function defines which of the following two fields will be used, for example, either command or status. Entry 420 illustrates that the command field is the command sent from each of the FLMs. Entry 425 illustrates that the status field is the result of implementing the command and that both FLMs may be able to send a status.

Figure 5A:
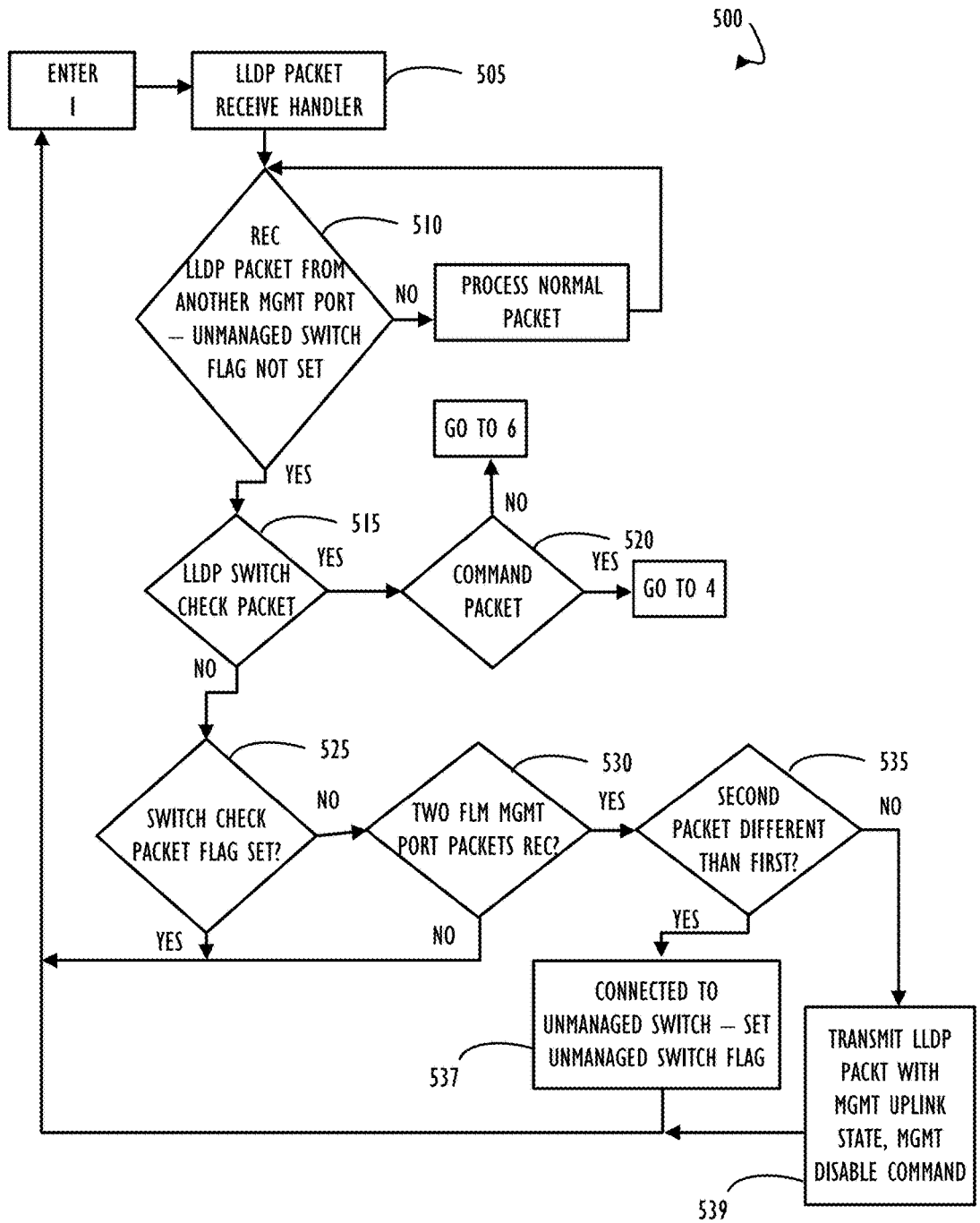

FIGS. 5A-C illustrate a single flow chart 500 (portions 540 FIG. 5B and 570 FIG. 5C are sub-portions of flow chart 500 FIG. 5A) representing a possible method to perform non-compliant device detection, according to one or more disclosed implementations. For example, one sequence of detecting if an uplink is connected to an unmanaged switch or connected to another FLM uplink. Beginning at block 505 an LLDP packet is received. Decision 510 determines if the received LLDP packet is from another management port with the unmanages switch flag not set. If not, the packet is processed normally. If it is an LLDP switch check packet at decision 515, decision 520 checks if it is a command packet. If it is flow goes to entry 4, if not flow goes to entry 6. If it is not an LLDP switch check packet at decision 515 then flow goes to decision 525 where it is determined if the switch check packet flag is set. If so, flow returns to entry 1, if not, flow continues to block 530 where a decision is made if there have been two FLM management port packets received. If not, flow returns to entry 1, however, if so block 535 indicates that a check is made to determine if the second packet is different than the first. If so, then an unmanaged switch has been found and a flag to indicate may be set. If not, flow continues to block 539 where an LLDP packet with a management uplink state and management disable command may be transmitted.

Referring to FIG. 5B, flow chart 540 begins at block 541 where a received LLDP management uplink state is check to see if it is greater than a local management uplink state. If not, flow returns to entry 5. If it is however, flow continues to block 542 where it may be checked if the two uplink states are equal. If not, flow goes to block 543 where a link toggle may be performed and then flow returns to entry 1. If it is equal, then flow continues to decision 544 where a determination if the source MAC address is greater than the received source MAC address. If it is, we can perform a link toggle at block 543 and return to entry 1. If not, we proceed to entry 5.

Continuing with FIG. 58, flow chart 570 begins at block 571 (entry 5) where an LLDP packet with a management uplink state and management disable command may be transmitted. Block 572 indicates a wait for a configurable amount of time (e.g., 20 seconds). Decision 573 determines if a link toggle has been detected. If so, flow continues to block 575 where an LLDP packet with a link drop status TRUE may be sent. Flow continues to block 576 where an alert may be issued that management ports are connected together, and flow returns to entry 1. However, if a link toggle was not detected at decision 573, flow continues to block 574 where an LLDP packet may be sent that indicates no link toggle was detected. Block 577 indicates that we can set an unmanaged switch found flag. Block 578 indicates that a warning may be issued and continue back to entry 1.

Figure 6:
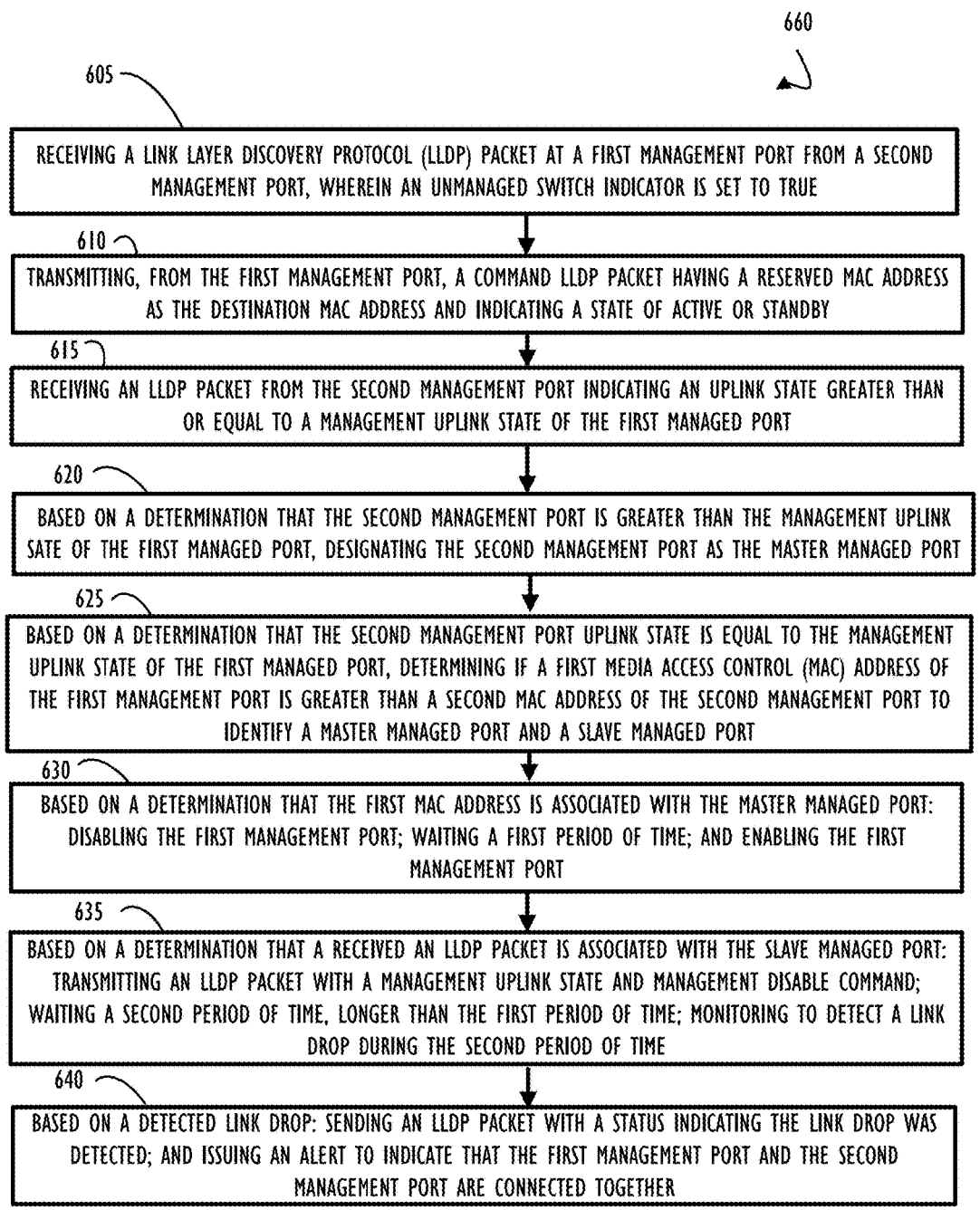
FIG. 6 represents an example method that may be used to actively detect a non-compliant device, according to one or more disclosed embodiments.

FIG. 6 represents an example method 600 that may be used to actively detect a non-compliant device, according to one or more disclosed embodiments. Example method 600 begins at block 605 with receiving a link layer discovery protocol (LLDP) packet at a first management port from a second management port, wherein an unmanaged switch indicator is set to true. Example method 600 continues at block 610 by transmitting, from the first management port, a command LLDP packet having a reserved MAC address as the destination MAC address and indicating a state of active or standby. Example method 600 continues at block 615 by receiving an LLDP packet from the second management port indicating an uplink state greater than or equal to a management uplink state of the first managed port. Example method 600 continues at block 620 with based on a determination that the second management port is greater than the management uplink state of the first managed port, designating the second management port as the master managed port. Example method 600 continues at block 625 with based on a determination that the second management port uplink state is equal to the management uplink state of the first managed port, determining if a first media access control (MAC) address of the first management port is greater than a second MAC address of the second management port to identify a master managed port and a slave managed port. Example method 600 continues at block 630 with based on a determination that the first MAC address is associated with the master managed port: disabling the first management port; waiting a first period of time; and enabling the first management port. Example method 600 continues at block 635 with based on a determination that a received an LLDP packet is associated with the slave managed port: transmitting an LLDP packet with a management uplink state and management disable command; waiting a second period of time, longer than the first period of time; monitoring to detect a link drop during the second period of time. Example method 600 completes at block 640 with based on a detected link drop: sending an LLDP packet with a status indicating the link drop was detected; and issuing an alert to indicate that the first management port and the second management port are connected together.

Figure 7:
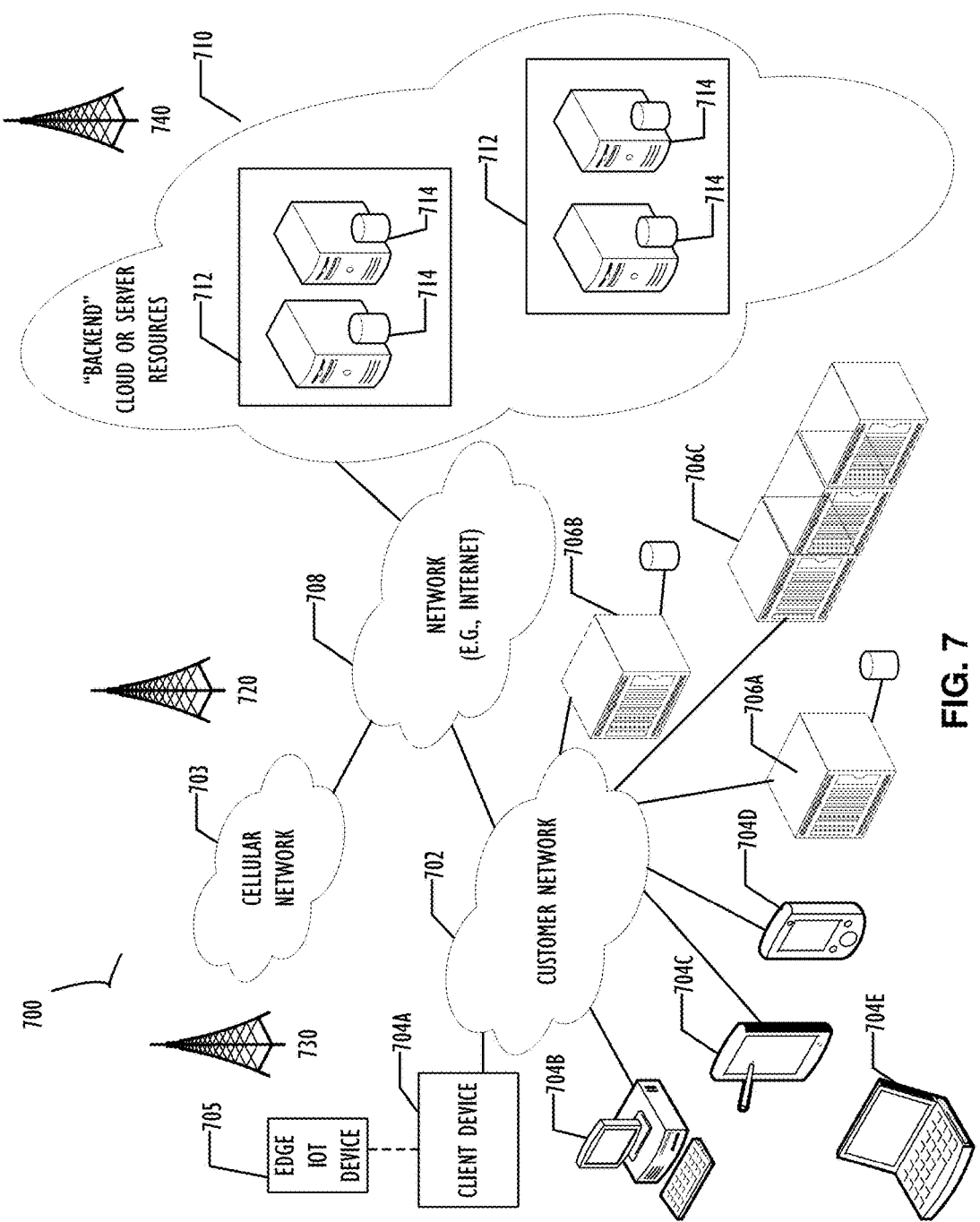
FIG. 7 represents a computer network infrastructure that may be used to implement all or part of the disclosed non-compliant device detection technique, according to one or more disclosed embodiments.

FIG. 7 represents a computer network infrastructure 700 that may be used to implement all or part of the disclosed non-compliant link detection technique or provide information flow between a system performing the technique and other computer networks, according to one or more disclosed embodiment. Network infrastructure 700 includes a set of networks where embodiments of the present disclosure may operate. Network infrastructure 700 comprises a customer network 702, network 708, cellular network 703, and a cloud service provider network 710. In one embodiment, the customer network 702 may be a local private network, such as local area network (LAN) that includes a variety of network devices that include, but are not limited to switches, servers, and routers.

Each of these networks can contain wired or wireless programmable devices and operate using any number of network protocols (e.g., TCP/IP) and connection technologies (e.g., WiFi® networks, or Bluetooth®. In another embodiment, customer network 702 represents an enterprise network that could include or be communicatively coupled to one or more local area networks (LANs), virtual networks, data centers and/or other remote networks (e.g., 708, 710). In the context of the present disclosure, customer network 702 may include a foreign device detection method such as that described above.

As shown in FIG. 7, customer network 702 may be connected to one or more client devices 704A-E and allow the client devices 704A-E to communicate with each other and/or with cloud service provider network 710, via network 708 (e.g., Internet). Client devices 704A-E may be computing systems such as desktop computer 704B, tablet computer 704C, mobile phone 704D, laptop computer (shown as wireless) 704E, and/or other types of computing systems generically shown as client device 704A.

Network infrastructure 700 may also include other types of devices generally referred to as Internet of Things (IoT) (e.g., edge IOT device 705) that may be configured to send and receive information via a network to access cloud computing services or interact with a remote web browser application (e.g., to receive configuration information).

FIG. 7 also illustrates that customer network 702 includes local compute resources 706A-C that may include a server, access point, router, or other device configured to provide for local computational resources and/or facilitate communication amongst networks and devices. For example, local compute resources 706A-C may be one or more physical local hardware devices, such as the frames outlined above. Local compute resources 706A-C may also facilitate communication between other external applications, data sources (e.g., 707A and 707B), and services, and customer network 702.

Network infrastructure 700 also includes cellular network 703 for use with mobile communication devices. Mobile cellular networks support mobile phones and many other types of mobile devices such as laptops etc. Mobile devices in network infrastructure 700 are illustrated as mobile phone 704D, laptop computer 704E, and tablet computer 704C. A mobile device such as mobile phone 704D may interact with one or more mobile provider networks as the mobile device moves, typically interacting with a plurality of mobile network towers 720, 730, and 740 for connecting to the cellular network 703.

FIG. 7 illustrates that customer network 702 is coupled to a network 708. Network 708 may include one or more computing networks available today, such as other LANs, wide area networks (WAN), the Internet, and/or other remote networks, in order to transfer data between client devices 704A-D and cloud service provider network 710. Each of the computing networks within network 708 may contain wired and/or wireless programmable devices that operate in the electrical and/or optical domain.

In FIG. 7, cloud service provider network 710 is illustrated as a remote network (e.g., a cloud network) that is able to communicate with client devices 704A-E via customer network 702 and network 708. The cloud service provider network 710 acts as a platform that provides additional computing resources to the client devices 704A-E and/or customer network 702. In one embodiment, cloud service provider network 710 includes one or more data centers 712 with one or more server instances 714. Cloud service provider network 710 may also include one or more frames representing a scalable compute resource that may benefit from the techniques of this disclosure.

Figure 8:
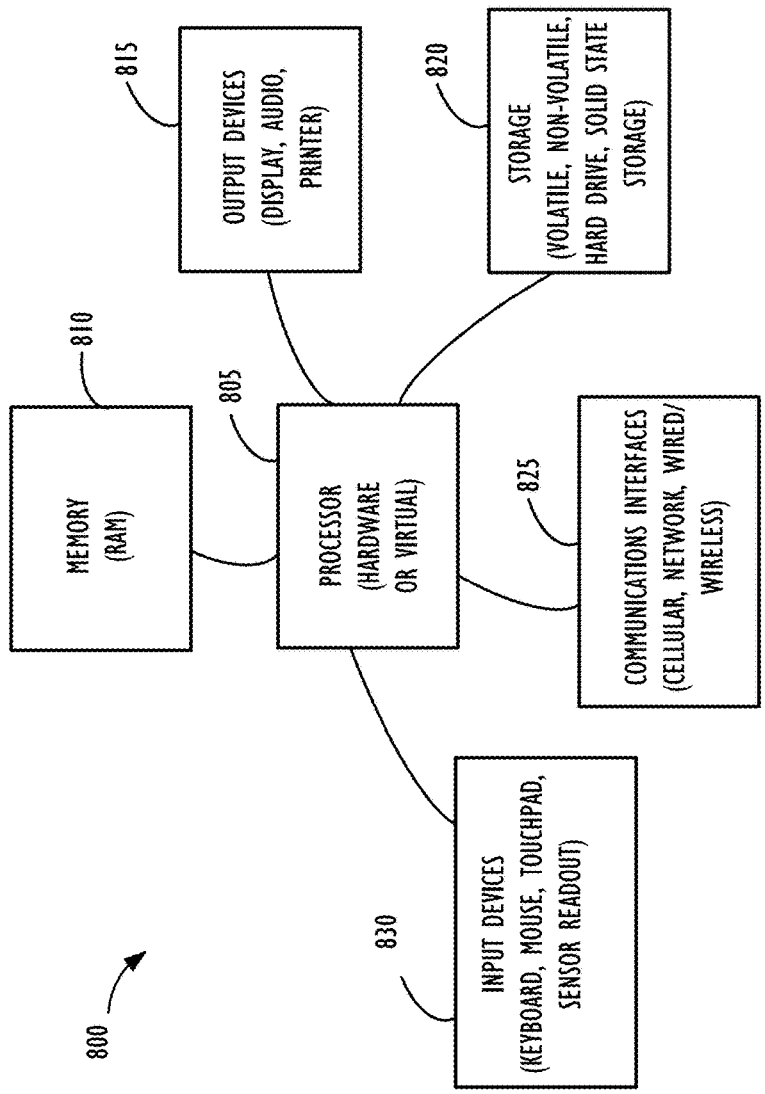
FIG. 8 illustrates a computer processing device that may be used to implement the functions, modules, processing platforms, execution platforms, communication devices, and other methods and processes of this disclosure.

FIG. 8 illustrates a computer processing device 800 that may be used to implement the functions, modules, processing platforms, execution platforms, communication devices, and other methods and processes of this disclosure. For example, computing device 800 illustrated in FIG. 8 could represent a client device or a physical server device and include either hardware or virtual processor(s) depending on the level of abstraction of the computing device. In some instances (without abstraction), computing device 800 and its elements, as shown in FIG. 8, each relate to physical hardware. Alternatively, in some instances one, more, or all of the elements could be implemented using emulators or virtual machines as levels of abstraction. In any case, no matter how many levels of abstraction away from the physical hardware, computing device 800 at its lowest level may be implemented on physical hardware.

As also shown in FIG. 8, computing device 800 may include one or more input devices 830, such as a keyboard, mouse, touchpad, or sensor readout (e.g., biometric scanner) and one or more output devices 815, such as displays, speakers for audio, or printers. Some devices may be configured as input/output devices also (e.g., a network interface or touchscreen display).

Computing device 800 may also include communications interfaces 825, such as a network communication unit that could include a wired communication component and/or a wireless communications component, which may be communicatively coupled to processor 805. The network communication unit may utilize any of a variety of proprietary or standardized network protocols, such as Ethernet, TCP/IP, to name a few of many protocols, to effect communications between devices. Network communication units may also comprise one or more transceiver(s) that utilize the Ethernet, power line communication (PLC), WiFi, cellular, and/or other communication methods.

As illustrated in FIG. 8, computing device 800 includes a processing element such as processor 805 that contains one or more hardware processors, where each hardware processor may have a single or multiple processor cores. In one embodiment, the processor 805 may include at least one shared cache that stores data (e.g., computing instructions) that are utilized by one or more other components of processor 805. For example, the shared cache may be a locally cached data stored in a memory for faster access by components of the processing elements that make up processor 805. In one or more embodiments, the shared cache may include one or more mid-level caches, such as level 2 (L2), level 3 (L3), level 4 (L4), or other levels of cache, a last level cache (LLC), or combinations thereof. Examples of processors include but are not limited to a central processing unit (CPU) a microprocessor. Although not illustrated in FIG. 8, the processing elements that make up processor 805 may also include one or more of other types of hardware processing components, such as graphics processing units (GPU), application specific integrated circuits (ASICs), field-programmable gate arrays (FPGAs), and/or digital signal processors (DSPs).

FIG. 8 illustrates that memory 810 may be operatively and communicatively coupled to processor 805. Memory 810 may be a non-transitory medium configured to store various types of data. For example, memory 810 may include one or more storage devices 820 that comprise a non-volatile storage device and/or volatile memory. Volatile memory, such as random-access memory (RAM), can be any suitable non-permanent storage device. The non-volatile storage devices 820 can include one or more disk drives, optical drives, solid-state drives (SSDs), tap drives, flash memory, read only memory (ROM), and/or any other type of memory designed to maintain data for a duration of time after a power loss or shut down operation. In certain instances, the non-volatile storage devices 820 may be used to store overflow data if allocated RAM is not large enough to hold all working data. The non-volatile storage devices 820 may also be used to store programs that are loaded into the RAM when such programs are selected for execution.

Persons of ordinary skill in the art are aware that software programs may be developed, encoded, and compiled in a variety of computing languages for a variety of software platforms and/or operating systems and subsequently loaded and executed by processor 805. In one embodiment, the compiling process of the software program may transform program code written in a programming language to another computer language such that the processor 805 is able to execute the programming code. For example, the compiling process of the software program may generate an executable program that provides encoded instructions (e.g., machine code instructions) for processor 805 to accomplish specific, non-generic, particular computing functions.

After the compiling process, the encoded instructions may then be loaded as computer executable instructions or process steps to processor 805 from storage device 820, from memory 810, and/or embedded within processor 805 (e.g., via a cache or on-board ROM). Processor 805 may be configured to execute the stored instructions or process steps in order to perform instructions or process steps to transform the computing device into a non-generic, particular, specially programmed machine or apparatus. Stored data, e.g., data stored by a storage device 820, may be accessed by processor 805 during the execution of computer executable instructions or process steps to instruct one or more components within the computing device 800.

A user interface (e.g., output devices 815 and input devices 830) can include a display, positional input device (such as a mouse, touchpad, touchscreen, or the like), keyboard, or other forms of user input and output devices. The user interface components may be communicatively coupled to processor 805. When the output device is or includes a display, the display can be implemented in various ways, including by a liquid crystal display (LCD) or a cathode-ray tube (CRT) or light emitting diode (LED) display, such as an organic light emitting diode (OLED) display. Persons of ordinary skill in the art are aware that the computing device 800 may comprise other components well known in the art, such as sensors, powers sources, and/or analog-to-digital converters, not explicitly shown in FIG. 8.

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to. . . . " Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

The above discussion is meant to be illustrative of the principles and various implementations of the present disclosure. Numerous variations and modifications will become apparent to those skilled in the art once the above disclosure is fully appreciated. It is intended that the following claims be interpreted to embrace all such variations and modifications.

What is claimed is:

1. A computer-implemented method comprising:
receiving a link layer discovery protocol (LLDP) packet at a first management port from a second management port, wherein an unmanaged switch indicator is set to true;
transmitting, from the first management port, a command LLDP packet having a reserved MAC address as the destination MAC address and indicating a state of active or standby;
receiving an LLDP packet from the second management port indicating an uplink state greater than or equal to a management uplink state of the first managed port;
based on a determination that the second management port is greater than the management uplink state of the first managed port, designating the second management port as the master managed port;
based on a determination that the second management port uplink state is equal to the management uplink state of the first managed port, determining if a first media access control (MAC) address of the first management port is greater than a second MAC address of the second management port to identify a master managed port and a slave managed port;
based on a determination that the first MAC address is associated with the master managed port: disabling the first management port; waiting a first period of time; and enabling the first management port;
based on a determination that a received an LLDP packet is associated with the slave managed port: transmitting an LLDP packet with a management uplink state and management disable command; waiting a second period of time, longer than the first period of time; monitoring to detect a link drop during the second period of time; and
based on a detected link drop: sending an LLDP packet with a status indicating the link drop was detected; and issuing an alert to indicate that the first management port and the second management port are connected together.

2. The computer implemented method of claim 1, further comprising:
based on a timeout of the second period of time without the detected link drop: sending an LLDP packet with a status indicating the link drop was not detected; setting a flag to indicate that an unmanaged switch was found; and issuing a warning to indicate that an unmanaged switch was found.

3. The computer implemented method of claim 1, wherein receiving LLDP packets from two sources without detecting a drop in an electrical signal related to a requested toggle of a link identifies an unmanaged system.

4. The computer implemented method of claim 1, wherein configurable timeout periods are automatically ended upon receipt of a signal responsive to the configurable timeout associate with a request.

5. The computer implemented method of claim 1, wherein the unmanages switch found indicator is only generated a configurable number of times for a given unmanaged switch being detected.

6. A non-transitory computer readable medium comprising computer executable instructions stored thereon that when executed by one or more processing units, perform a method to detect an unmanaged switch in a network segment or incorrect connectivity of two ports, the method comprising:

receiving a link layer discovery protocol (LLDP) packet at a first management port from a second management port, wherein an unmanaged switch indicator is set to true;

transmitting, from the first management port, a command LLDP packet having a reserved MAC address as the destination MAC address and indicating a state of active or standby;

receiving an LLDP packet from the second management port indicating an uplink state greater than or equal to a management uplink state of the first managed port;

based on a determination that the second management port is greater than the management uplink state of the first managed port, designating the second management port as the master managed port;

based on a determination that the second management port uplink state is equal to the management uplink state of the first managed port, determining if a first media access control (MAC) address of the first management port is greater than a second MAC address of the second management port to identify a master managed port and a slave managed port;

based on a determination that the first MAC address is associated with the master managed port: disabling the first management port; waiting a first period of time; and enabling the first management port;

based on a determination that a received an LLDP packet is associated with the slave managed port: transmitting an LLDP packet with a management uplink state and management disable command; waiting a second period of time, longer than the first period of time; monitoring to detect a link drop during the second period of time; and based on a detected link drop: sending an LLDP packet with a status indicating the link drop was detected; and issuing an alert to indicate that the first management port and the second management port are connected together.

7. The non-transitory computer readable medium of claim 6, further comprising:
based on a timeout of the second period of time without the detected link drop: sending an LLDP packet with a status indicating the link drop was not detected; setting a flag to indicate that an unmanaged switch was found; and issuing a warning to indicate that an unmanaged switch was found.

8. The non-transitory computer readable medium of claim 6, wherein receiving LLDP packets from two sources without detecting a drop in an electrical signal related to a requested toggle of a link identifies an unmanaged system.

9. The non-transitory computer readable medium of claim 6, wherein configurable timeout periods are automatically ended upon receipt of a signal responsive to the configurable timeout associate with a request.

10. The non-transitory computer readable medium of claim 6, wherein the unmanages switch found indicator is only generated a configurable number of times for a given unmanaged switch being detected.

11. A computer network, comprising:
a first management port associated with a first network communications interface communicatively coupled to the computer network;
a second management port associated with a second network communications interface communicatively coupled to the computer network;
a memory; and
one or more processing units, communicatively coupled to the memory and at least one of the first of second network communications interface, wherein the memory stores instructions, that when executed by the one or more processing units, cause the one or more processing units to provide an unmanaged switch in a network segment or incorrect connectivity of two ports function, the an unmanaged switch in a network segment or incorrect connectivity of two ports function configured to:
receive a link layer discovery protocol (LLDP) packet at a first management port from a second management port, wherein an unmanaged switch indicator is set to true;
transmit, from the first management port, a command LLDP packet having a reserved MAC address as the destination MAC address and indicating a state of active or standby;
receive an LLDP packet from the second management port indicating an uplink state greater than or equal to a management uplink state of the first managed port;
based on a determination that the second management port is greater than the management uplink state of the first managed port, designate the second management port as the master managed port;
based on a determination that the second management port uplink state is equal to the management uplink state of the first managed port, determine if a first media access control (MAC) address of the first management port is greater than a second MAC address of the second management port to identify a master managed port and a slave managed port;
based on a determination that the first MAC address is associated with the master managed port: disabling the first management port; waiting a first period of time; and enabling the first management port;
based on a determination that a received an LLDP packet is associated with the slave managed port: transmitting an LLDP packet with a management uplink state and management disable command; waiting a second period of time, longer than the first period of time; monitoring to detect a link drop during the second period of time; and
based on a detected link drop: sending an LLDP packet with a status indicating the link drop was detected; and issuing an alert to indicate that the first management port and the second management port are connected together.

12. The computer network of claim 11, wherein the function further comprises:
based on a timeout of the second period of time without the detected link drop: sending an LLDP packet with a status indicating the link drop was not detected; setting a flag to indicate that an unmanaged switch was found; and issuing a warning to indicate that an unmanaged switch was found.

13. The computer network of claim 11, wherein receiving LLDP packets from two sources without detecting a drop in an electrical signal related to a requested toggle of a link identifies an unmanaged system.

14. The computer network of claim 11, wherein configurable timeout periods are automatically ended upon receipt of a signal responsive to the configurable timeout associate with a request.

15. The computer network of claim 11, wherein the unmanages switch found indicator is only generated a configurable number of times for a given unmanaged switch being detected.

* * * * *